(12) United States Patent
Ilan et al.

(10) Patent No.: US 9,915,473 B2
(45) Date of Patent: Mar. 13, 2018

(54) SPRAY-DRYING APPARATUS AND METHOD OF USE

(71) Applicant: Omrix Biopharmaceuticals Ltd., Rehovot (IL)

(72) Inventors: Erez Ilan, Kibbutz Netzer Sereni (IL); Assaf Gershonovitch, Kfar-Saba (IL); Yotam Gurman, Kibbutz Or Haner (IL)

(73) Assignee: Omrix Biopharmaceuticals Ltd., Rehovot (IL)

( * ) Notice: Subject to any disclaimer, the term of this patent is extended or adjusted under 35 U.S.C. 154(b) by 0 days.

(21) Appl. No.: 14/943,244

(22) Filed: Nov. 17, 2015

(65) Prior Publication Data

US 2016/0138866 A1    May 19, 2016

Related U.S. Application Data

(60) Provisional application No. 62/081,094, filed on Nov. 18, 2014.

(30) Foreign Application Priority Data

Nov. 18, 2014  (IL) .......................................... 235751

(51) Int. Cl.
*F26B 3/12*     (2006.01)
*F26B 7/00*     (2006.01)

(52) U.S. Cl.
CPC . *F26B 3/12* (2013.01); *F26B 7/00* (2013.01)

(58) Field of Classification Search
CPC ...... F26B 3/00; F26B 3/12; F26B 7/00; B05B 7/066; B05B 7/10; B01J 2/04
USPC .............................. 34/357, 60; 159/4.01, 4.2
See application file for complete search history.

(56) References Cited

U.S. PATENT DOCUMENTS

| | | | |
|---|---|---|---|
| 2,833,345 A | 5/1953 | Van Der Pyl | |
| 3,621,902 A | 11/1971 | Okada et al. | |
| 3,727,290 A * | 4/1973 | Schaumburg | B21B 38/00 29/424 |
| 3,789,585 A * | 2/1974 | Arnold | B01D 47/06 210/221.1 |
| 5,227,017 A | 7/1993 | Tanaka et al. | |
| 5,615,493 A * | 4/1997 | Funder | A23L 3/46 34/168 |
| 5,782,011 A * | 7/1998 | Boersen | B01D 1/18 34/366 |
| 5,851,575 A | 12/1998 | Griffin et al. | |
| 6,121,232 A | 9/2000 | Nur et al. | |
| 6,240,655 B1 * | 6/2001 | Fruhling | H01L 21/67017 34/357 |

(Continued)

FOREIGN PATENT DOCUMENTS

DE    202005015411 U1    3/2006
EP         2728288 A1    5/2014

(Continued)

OTHER PUBLICATIONS

International Search Report re: PCT/IL2015/000048 dated Mar. 4, 2016.

(Continued)

*Primary Examiner* — Stephen M Gravini
(74) *Attorney, Agent, or Firm* — David R. Crichton

(57) ABSTRACT

Provided is a spray drying apparatus comprising a spray nozzle comprising a spray nozzle tip at the distal end of the spray nozzle, a liquid conduit for guiding a liquid to be spray-dried out through the spray nozzle tip, an atomizing component for producing a spray of droplets from the liquid exiting the spray nozzle; a drying gas conduit comprising an outlet for directing a drying gas to dry the spray of droplets; and a drying gas deflector positioned so as to deflect a flow of the drying gas away from the spray nozzle tip.

20 Claims, 7 Drawing Sheets

(56) References Cited

U.S. PATENT DOCUMENTS

| | | | |
|---|---|---|---|
| 6,605,675 B2 * | 8/2003 | Mawson | B01J 4/002 |
| | | | 502/152 |
| 6,669,115 B2 * | 12/2003 | Sun | B05B 1/265 |
| | | | 239/403 |
| 7,125,569 B2 | 10/2006 | Nur et al. | |
| 8,343,550 B2 * | 1/2013 | Beyerinck | A61K 9/146 |
| | | | 34/372 |
| 9,370,756 B2 * | 6/2016 | Nielsen | B01J 2/16 |
| 2008/0095822 A1 * | 4/2008 | Maquet | A61K 9/0019 |
| | | | 424/426 |
| 2011/0250264 A1 * | 10/2011 | Schutt | A61K 31/4458 |
| | | | 424/450 |
| 2016/0138866 A1 * | 5/2016 | Ilan | F26B 7/00 |
| | | | 34/357 |

FOREIGN PATENT DOCUMENTS

| | | | |
|---|---|---|---|
| IL | WO 2016079727 A1 * | 5/2016 | B01J 2/04 |
| RU | 2435118 C1 | 11/2011 | |
| WO | WO 98/33533 | 8/1998 | |
| WO | WO 1998/49508 | 11/1998 | |
| WO | WO 02/095019 | 11/2002 | |
| WO | WO 2014/078694 A1 | 5/2014 | |

OTHER PUBLICATIONS

International Preliminary Report on Patentability re: PCT/IL2015/000048 dated May 23, 2017.

* cited by examiner

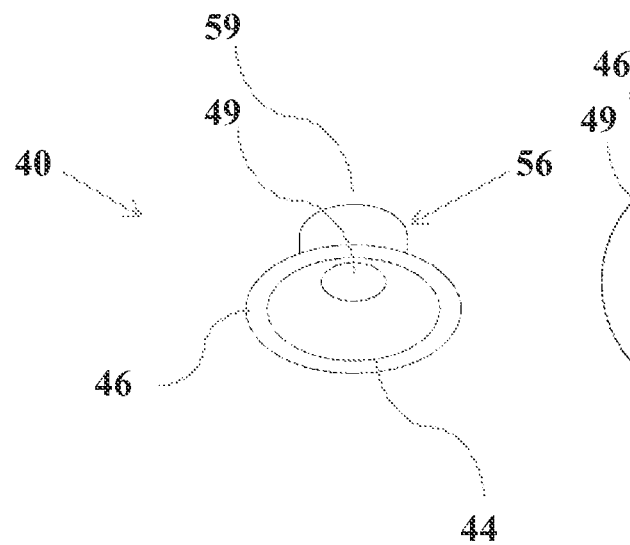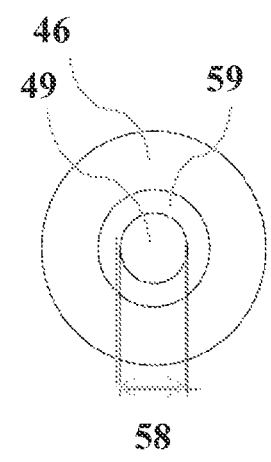
FIG. 4A    FIG. 4B
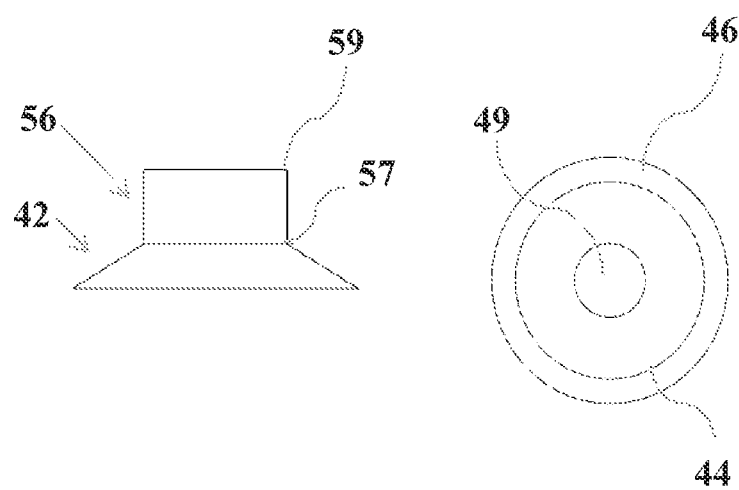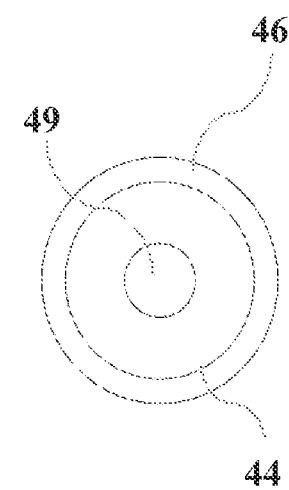
FIG. 4C    FIG. 4D

SPRAY-DRYING APPARATUS AND METHOD OF USE

FIELD OF THE INVENTION

The invention relates to the field of spray-drying, and more specifically to a spray-drying apparatus comprising a drying gas deflector and a method of use thereof.

BACKGROUND OF THE INVENTION

Spray drying involves atomization of a liquid, such as a solution, suspension or emulsion, for example by spraying through a spray nozzle while contacting with an atomizing gas to form spray particles; by two-fluid nozzle atomization, wherein spray is created by combination of a liquid flow and a gas flow, in which the atomization energy is provided by the gas flow; or by centrifugal atomization, wherein the solution is delivered in a rotating disc, such that spray is created by the energy created by the rotation of the disc. Alternatively, the liquid flow may be sprayed using a pressure nozzle in which the liquid flow is forced through a small aperture, the change in pressure transforming the liquid flow into spray of small droplets.

Formation of spray particles is followed by drying of the spray in a hot gas (e.g. air) flow provided by a drying gas conduit. The spray particles rapidly dry yielding a powder, which is then separated from the hot air flow in a cyclone device, and may be subsequently collected in a collection container, such as a vial. An example of a commercially available spray-drying apparatus 10 is illustrated in FIG. 1, comprising a drying column 12, having a spray nozzle 14 and a drying gas conduit 16.

Spray nozzle 14 has a proximal end 18 and a distal end 20, with a spray nozzle tip 22 at distal end 20. An atomizing component 25 (shown in FIG. 2, which is an enlarged view of spray nozzle 14) is provided at distal end 20 of spray nozzle tip 22, which is responsible for producing a spray from the liquid.

A liquid conduit 24, having a distal end at spray nozzle tip 22, is provided for carrying a liquid to be spray-dried to spray nozzle tip 22, through which the liquid is passed.

FIG. 2 shows a spray nozzle 14 comprising an atomizing component 25. An atomizer gas conduit 26 is provided for guiding an atomizing gas to atomizing component 25, which delivers the atomizing gas to the proximity of distal end of liquid conduit 24 at spray nozzle tip 22. The atomizing gas contacts the liquid during passing or exiting of the liquid out through spray nozzle tip 22, whereby a spray is formed from the liquid. Any suitable inert gas may be used as an atomizing gas including air, nitrogen and argon. Preferably, the atomizing gas is dry, having a relative humidity of no more than about 30%. Typically, the drying gas is heated to a temperature in the range of from about 100° C. to about 190° C.

Drying gas conduit 16 comprises a drying gas outlet 28 for providing a drying gas to dry the spray formed from the liquid upon exiting nozzle tip 22, thereby forming a powder.

The powder produced is separated from the drying gas by a cyclone unit 30, and is collected at the bottom of cyclone unit 30 e.g. in a collection container 32. The paths of the separated drying gas and of the powder are shown in FIG. 1 as 35 and 36, respectively.

As is known, proteins (e.g. fibrinogen) are generally sensitive to high temperature for example, human proteins are sensitive to temperatures of 45° C. or above. As a result, when a protein-containing liquid is spray dried, the resulting spray-dried protein may undergo denaturation and/or reduction or loss of potency. Also, sedimentation at the spray nozzle tip may occur, resulting in partial or full blockage of the spray nozzle tip, loss of material and/or protein aggregation.

In an attempt to reduce the temperature of liquid to be spray-dried in liquid conduit 24, it is known in the art to provide a heat exchange mechanism. One such mechanism is schematically depicted in FIG. 2, comprising two tubes for circulating cool water i.e. a first tube 34a for entry of cool water, arranged concentrically around liquid conduit 24, and a second tube 34b for exit of cool water, with cool water circulating into first tube 34a and out of second tube 34b to a water bath, using a circulation pump (not shown).

Background art include U.S. Pat. No. 5,227,017, U.S. Pat. No. 2,833,345, WO2014078694A1, U.S. Pat. No. 5,851,575A, EP0979377A1, RU2435118C1, DE202005015411U1 and EP2728288A1.

SUMMARY OF THE INVENTION

The invention, in some embodiments thereof, relates to a spray-drying apparatus comprising a drying gas deflector and a method of use thereof that in some embodiments may have some advantages compared to the prior art and/or in some embodiments may mitigate some of the challenges encountered in spray-drying as described above.

As discussed in the Background section, it is known to use heat exchange mechanisms for cooling of a liquid to be spray dried. However, such heat exchange mechanisms do not provide cooling of a spray nozzle tip. As a result the spray nozzle tip is heated by a drying gas, causing harmful effects on heat-sensitive substances during spray-drying, such as denaturation and/or decrease in activity and/or potency of proteins and/or accumulation of a layer of dried substance on the spray nozzle tip that changes the spray pattern and/or can even lead to a partial or full blockage of the nozzle.

Aspects and embodiments of the invention are described in the specification hereinbelow and in the appended claims.

According to an aspect of some embodiments described herein, there is provided a spray drying apparatus 10 comprising:

(i) a spray nozzle 14 having a proximal end 18 and a distal end 20, the spray nozzle comprising:
  a spray nozzle tip 22 at the distal end of the spray nozzle;
  a liquid conduit 24 for guiding a liquid to be spray-dried out through the spray nozzle tip;
  an atomizing component 25 for producing a spray of droplets from the liquid exiting the spray nozzle;

(ii) a drying gas conduit 16 comprising an outlet 28 for directing a drying gas to dry the spray of droplets; and (iii) a drying gas deflector 40 positioned so as to deflect a flow of the drying gas away from the spray nozzle tip.

In some embodiments, there is provided a method of spray drying a liquid comprising:
  providing a spray drying apparatus 10 as disclosed herein;
  spraying a liquid as a spray of droplets from a spray nozzle tip 22;
  directing a flow of drying gas at the spray of droplets; and
  deflecting a flow of the drying gas away from the spray nozzle tip using the drying gas deflector.

In some embodiments of the apparatus or method described herein, the spray drying apparatus does not include a heat exchange mechanism.

In some embodiments of the apparatus or method described herein, an atomizing component 25 is provided at distal end 20 of spray nozzle tip 22, and liquid conduit 24, having a distal end at spray nozzle tip 22, is provided for carrying a liquid to be spray dried to spray nozzle tip 22.

In some embodiments, the atomizing component 25 comprises an atomizing gas conduit 26, for guiding a flow of atomizing gas out through an atomizing gas outlet to contact liquid exiting the spray nozzle tip.

In some embodiments, the liquid is forced at high pressure through a small aperture located at the distal end of atomizing component 25, resulting in a pressure drop which turns the liquid into a spray of droplets e.g. fine droplets. Hence, in some embodiments, the atomizing component 25 comprises an aperture located at the distal end of the liquid conduit 24, wherein the liquid is forced out through the aperture to form a spray.

In some embodiments, atomizing component 25 comprises a rotating disc wherein the spray of the liquid is formed by centrifugal forces created by the rotation of the disc.

In some embodiments, deflection of the flow of drying gas away from spray nozzle tip 22 using a drying gas deflector as disclosed herein potentially minimize or prevents overheating of spray nozzle tip 22 and/or of the liquid to be spray-dried, in some embodiments, thereby preventing undesirable effects on heat-sensitive substances, for example proteins, such as fibrinogen or thrombin, which are proteins of the blood coagulation cascade.

In some embodiments, deflecting the flow of drying gas away from the spray nozzle tip prevents the drying gas exiting the drying gas outlet from heating a space within up to about 3 mm of the spray nozzle tip in any direction.

In some embodiments, the drying gas deflector comprises an open base at a distal end.

In some embodiments, the drying gas deflector is mounted on the spray nozzle at a position proximal to the distal end of the spray nozzle, such that the spray nozzle tip does not protrude beyond the distal end 44 of the drying gas deflector.

In some embodiments, the drying gas deflector is mounted on a part of the spray nozzle that does not comprise a heat exchange mechanism. In some such embodiments, the part of the spray nozzle on which the drying gas deflector is mounted is selected from the group consisting of a portion of the length of the spray nozzle, the nozzle tip, the atomizing component and a combination thereof. In some embodiments, the drying gas deflector has a shape selected from the group consisting of a polygon, a circle and an oval.

In some embodiments, the periphery of the open base has a shape selected from the group consisting of a polygon (such as a triangle, a quadrilateral, a pentagon, a hexagon, a heptagon, an octagon, a nonagon or a decagon, or a star-shaped polygon), a circle and an oval.

In some embodiments, the drying gas deflector comprises a hollow, truncated cone portion 42 having an open base in the shape of a circle, constituting distal end 44 of the drying gas deflector; and side section 46 tapering to a proximal end 48, wherein the proximal end comprises an aperture 49 having a circumference configured for positioning around an outer circumference, at least partially, of a position proximal to the distal end of the spray nozzle.

In some embodiments, the drying gas deflector further comprises a hollow cylindrical portion 56 comprising a distal end 57 and a proximal end 59, distal end 57 extending from the proximal end 48 of the truncated cone portion in a direction opposite to that of the base of the truncated cone portion.

In some embodiments, the hollow cylindrical portion has an inner diameter 58 configured for positioning at least partially around an outer circumference of the spray nozzle.

In some embodiments, the truncated cone portion and the hollow cylindrical portion are formed as a monolithic structure. In some such embodiments, distal end 57 and proximal end 48 are the same feature.

In some embodiments, the drying gas deflector is mounted directly on the spray nozzle and/or the nozzle tip.

In some embodiments, the drying gas deflector is mounted directly on the atomizing component.

In some embodiments, wherein the drying gas deflector comprises a cylindrical portion, the cylindrical portion is mounted directly on the atomizing component.

In some embodiments, the gas deflector covers, at least partially, a length of the spray nozzle. In some embodiments, the proximal end of the gas deflector covers, at least partially, a length of the spray nozzle. In some embodiments, the cylindrical portion of the gas deflector covers at least partially a length of the spray nozzle.

In some embodiments, the cylindrical portion of the gas deflector covers the entire length of the spray nozzle.

In some embodiments, the drying gas deflector is mounted on a part of the spray drying apparatus other than the spray nozzle or the nozzle tip.

In some embodiments, the drying gas deflector is formed from a thermally insulating material, such as a material having a thermal conductivity of not more than 2 W/(m·K) at 300 K.

In some embodiments, the drying gas deflector is formed from a material selected from the group consisting of silicone and polytetrafluoroethyiene (Teflon®).

In some embodiments, the base of the drying gas deflector is substantially circular, having a circumference in the range of from about 0.1 to about 10 mm.

In some embodiments, the side sections of the drying gas deflector have a length 50 in the range of from about 0.1 to about 10 mm.

In some embodiments, length 63 i.e. a distance from the proximal end to the distal end of the drying gas deflector is in the range of from about 1 to about 10 mm.

In some embodiments, an opening angle 66 between the side sections of the drying gas deflector is in the range of about 1 to about 180°.

In some embodiments, the hollow cylinder of the drying gas deflector has a length 62 in the range of from about 1 to about 10 mm.

In some embodiments, the inner dimensions of the drying gas deflector are such so as not to interfere with propagation of the spray.

In some embodiments, a temperature of the drying gas is at least 100° C.

In some embodiments, a temperature of the drying gas is in the range of from about 100° C. to about 200° C., such as about 140° C.

In some embodiments, the liquid comprises a heat-sensitive substance.

In some embodiments, the liquid is selected from the group consisting of a solution, suspension and emulsion comprising the heat-sensitive substance, such as a protein, for example fibrinogen. In some embodiments, the liquid is a proteinaceous solution.

Fibrinogen and thrombin can optionally be prepared from an initial blood composition. The blood composition can be whole blood or a blood fraction, i.e. a fraction of whole blood such as plasma. The origin of the fibrinogen and thrombin can be autologous i.e. fibrinogen or thrombin manufactured from the patient's own blood, from pooled blood or blood fractions. Thrombin or fibrinogen may also be prepared by recombinant methods.

In one embodiment of the invention, the fibrinogen comprises a biologically active component (BAC) which is a solution of proteins derived from blood plasma, optionally further comprising anti fibrinolytic agents such as tranexamic acid and/or stabilizers such as arginine, lysine, pharmaceutically acceptable salts thereof, or mixtures thereof. BAC is optionally derived from cryoprecipitate, in particular concentrated cryoprecipitate.

The term "cryoprecipitate" refers to a blood component which is obtained from frozen plasma prepared from whole blood, recovered plasma or from source plasma which is collected by plasmapheresis. A cryoprecipitate is optionally obtained when frozen plasma is slowly thawed in the cold, typically at a temperature of 0-4° C., resulting in the formation of precipitate that contains fibrinogen and factor XIII. The precipitate can be collected, for example, by centrifugation and dissolved in a suitable buffer such as a buffer containing 120 mM sodium chloride, 10 mM trisodium citrate, 120 mM glycine, 95 mM arginine hydrochloride, 1 mM calcium chloride.

The solution of BAC optionally comprises additional factors such as for example factor VIII, fibronectin, von Willebrand factor (vWF), vitronectin, etc. for example as described in U.S. Pat. No. 6,121,232 and WO9833533.

The composition of BAC optionally comprises stabilizers such as tranexamic acid and arginine hydrochloride. The amount of tranexamic acid in the solution of BAC is optionally in the range of from about 80 to about 110 mg/ml. The amount of arginine hydrochloride is optionally in the range of from about 15 to about 25 mg/ml.

Optionally, the fibrinogen solution is buffered to a physiological compatible pH value. The buffer optionally comprises glycine, sodium citrate, sodium chloride, calcium chloride and water for injection as a vehicle. Glycine is optionally present in the composition at a concentration in the range of from about 6 to about 10 mg/ml; sodium citrate is optionally present at a concentration in the range of from about 1 to about 5 mg/ml; sodium chloride is optionally present at a concentration in the range of from about 5 to about 9 mg/ml; and calcium chloride is optionally present at a concentration in the range of from about 0.1 to about 0.2 mg/ml.

In one embodiment of the invention, the fibrinogen is derived from blood e.g. BAC composition. In another embodiment of the invention, the concentration of plasminogen and/or plasmin in the blood derived component is lowered. The removal of plasmin and plasminogen from the blood derived component can be carried out as described in U.S. Pat. No. 7,125,569 and WO02095019.

The thrombin solution optionally comprises human thrombin (800-1200 IU/ml), calcium chloride, human albumin, mannitol, sodium acetate and water for injection. In some embodiments, the concentration of the fibrinogen component is about 60 mg/ml, and the concentration of the thrombin component is about 1000 IU/ml.

Fibrinogen and thrombin components are available from manufacturers such as OMRIX e.g. EVICEL®, QUIXIL®, ADHEXIL™; EVITHROM®; Baxter e.g. TISEEL®; CSL e.g. Beriplast® and the like. In one embodiment, the fibrinogen and thrombin components are manufactured from pooled human source plasma and provided as a single use kit consisting of two vials: one vial contains a Biological Active Component 1 or 2 (BAC1 or BAC2) and another vial comprises the thrombin component.

Overheating of the spray nozzle tip 22 may be minimized or prevented before and/or during the point at which the liquid or the spray formed from the liquid exits nozzle tip 22.

Use of a drying gas deflector according to the teachings herein, in some embodiments, reduces and/or prevents denaturation of proteins and other heat-sensitive substances during spray-drying and/or substantially maintains the potency of the proteins and/or reduces accumulation of solid substance around spray nozzle tip 22 and/or reduces or prevents changes in the spraying pattern and potential blockage of spray nozzle tip 22. Typically, an ideal spray pattern has a conical shape formed by fine droplets. Any change in the spray pattern i.e. sudden increase in droplets size and/or spray cone direction change may lead to accumulation of solutes on the spray tip, spray dryer column or other parts of the spray dryer unit.

Some embodiments of the method disclosed herein enables spray-drying of a solution containing a heat-sensitive substance (such as a protein) and produces a dry powder with a relatively high yield of the heat-sensitive substance.

Dry powder for use in preparation of pharmaceutical compositions is commonly prepared by lyophilization of a solution.

As used herein, the term "yield" with regard to a protein, is the percentage of protein (biological) potency upon reconstitution of the powder as compared to the protein potency in the solution prior to spray drying.

As used herein, the term "potency" refers to the effectiveness of a substance i.e. the ability to achieve a desired result. In one embodiment, when the protein is fibrinogen, protein potency includes, inter alia, the potential to be cleaved by thrombin (or a proteolytic enzyme which is capable of forming fibrin upon reaction with fibrinogen) and form fibrin.

In some embodiments, freeze drying (also known as lyophilization) of the solution and subsequent milling of the dry powder is unnecessary.

The term "lyophilization" typically refers to the process of freezing a solution and then reducing the concentration of water e.g. by sublimation to levels which do not support biological or chemical reactions.

Many pharmaceuticals and surgical-aid products contain dry drug substances, which are usually dried from their liquid phase to their dry phase by freeze drying. The process for the production of the lyophilized drug substance is a batch process which usually lasts for several days and is limited by the capacity of the lyophilizer size. This puts the entire drying batch at risk for a significant amount of time until the process is completed. Furthermore, the lyophilized drug substance produced is in the form of a "cake" which needs further processing steps, including breaking, sieving and/or milling to obtain a powder. These steps may decrease the potency and mass yield of the dry product.

Advantageously, using a spray-drying process instead of lyophilization provides a cost effective, continuous and high-capacity process, in which the dry product is immediately obtained in a form of dry powder and not as a "cake".

As used herein, the term "cake" or "solid cake" refers to a porous and spongy structure-like composition resulting from the lyophilization process.

As shown in the Examples section below, in some embodiments using a drying gas deflector according to the teachings herein during a spray-drying process advantageously results in formation of a uniform spray pattern, i.e.

a spray of fine droplets which the droplet size and/or direction and/or flow rate does not change during the entire spray-drying process, resulting in improved yields of the spray-dried substance.

As used herein, the term "fine droplets" may refer to droplets which may be dried into powder upon contacting the drying gas flow under specific spray drying conditions, while large droplets may not be dried to powder under the same specific conditions, but instead stick to the inner walls of the spray drying apparatus, where they are dried, resulting in loss of process product i.e. reduction in mass yield. According to some embodiments, "fine droplets" are those having a diameter of equal to or lower than 1 mm. According to some embodiments, "large droplets" refer to droplets having a size of greater than 1 mm.

According to a further aspect of some embodiments described herein, there is provided a method of spray drying a liquid comprising:

providing a spray drying apparatus 10 including a drying gas deflector as disclosed herein:

forming a spray of droplets from the liquid exiting the spray nozzle tip of the apparatus;

directing a stream of drying gas at the spray of droplets;

deflecting a flow of the drying gas away from the spray nozzle tip using the drying gas deflector.

Any suitable droplet size may be used to implement the teachings herein. In some embodiments, the droplets have a diameter of between 1 and 1000 micrometers.

According to some embodiments of the spray drying apparatus or method disclosed herein, deflecting the flow of drying gas away from the spray nozzle tip prevents the drying gas exiting the drying gas outlet from heating a space within up to about 5 mm from the nozzle tip in any direction, such as, for example, up to about 1 mm, up to about 2 mm, up to about 3 mm, up to about 4 mm or up to about 5 mm of the nozzle tip.

According to some embodiments of the spray drying apparatus or method disclosed herein, deflecting the flow of drying gas away from the spray nozzle tip prevents the drying gas exiting the drying gas outlet from contacting the spray nozzle tip.

According to some embodiments of the spray drying apparatus or method disclosed herein, the drying gas deflector is mounted on the spray nozzle, such that the spray nozzle tip does not protrude beyond a distal end 44 of the drying gas deflector. In some such embodiments, the drying gas deflector is mounted at a position proximal to the distal end the spray nozzle.

As used herein, the term "mounted" means fixed to, either directly or indirectly. According to some embodiments the drying gas deflector has a shape selected from the group consisting of a polygon, a circle and an oval.

According to some embodiments, the drying gas deflector comprises an open base at a distal end thereof.

According to some embodiments, the periphery of the open base has a shape selected from the group consisting of a polygon (such as, for example, a polygon selected from the group consisting of a triangle, a quadrilateral, a pentagon, a hexagon, a heptagon, an octagon, a nonagon and a decagon), a circle and an oval. In some embodiments, the polygon is a star-shaped polygon.

According to some embodiments, the open base has a shape that is a circle.

According to some embodiments, the drying gas deflector comprises a hollow, truncated conical portion 42 with the distal end, constituting the distal end 44 of the drying gas deflector, comprising an open base having a shape that is a circle and side section 46 tapering from the open base towards a proximal end 48, wherein the proximal end comprises an aperture 49 having a circumference configured for positioning at least partially around an outer circumference of a portion of the spray nozzle proximal to the distal end thereof. According to some embodiments, the aperture 49 has a circumference configured for positioning around the atomizing component 25.

According to some such embodiments, the drying gas deflector further comprises a hollow cylindrical portion 56 comprising a distal end 57 and a proximal end 59, distal end 57 extending from the proximal end 48 of the truncated cone portion 42 in a direction away from (opposite to) the distal end 44 of drying gas deflector, the hollow cylindrical portion 56 having an inner diameter 58 configured to be positioned concentrically, at least partially, around an outer portion of the spray nozzle. In some such embodiments, the portion of the spray nozzle on which the drying gas deflector is mounted is selected from the group consisting of a portion of the length of the spray nozzle, the nozzle tip, the atomizing component and a combination thereof.

According to some embodiments, the truncated conical portion and the hollow cylindrical portion are formed as a monolithic structure.

According to some embodiments, the truncated conical portion and the hollow cylindrical portion are formed as separate structures, which are connected one to the other by any method known in the art. Suitable methods include use of an adhesive (for example, applying adhesive to the distal edge/end of the hollow cylindrical portion and/or the proximal edge of the truncated cone portion) or configuring the truncated conical portion and the hollow cylindrical portion to be mateable, for example, by using connecting components (e.g., providing clips, tabs, slots, threads, pins, knobs and the like on the distal edge of the hollow cylindrical portion and/or the proximal edge of the truncated cone portion) and/or by welding.

According to some embodiments, the drying gas deflector is mounted directly on the spray nozzle. In some such embodiments, the drying gas deflector is held in place on the spray nozzle using, for example, a tube surrounding the spray nozzle and/or one or more rods supporting the drying gas deflector at a position above and around the spray nozzle tip. According to some embodiments, the drying gas deflector is mounted directly on the spray nozzle tip in such a way as to not interfere with droplet formation.

According to some embodiments, the drying gas deflector is mounted directly on the atomizing component.

According to some embodiments, the inner diameter 58 of a section of the drying gas deflector may be configured to fit securely directly around at least a portion of an outer surface of the spray nozzle such that mounting of the drying gas deflector on the spray nozzle comprises placing the drying gas deflector onto the outer portion of the spray nozzle. In some such embodiments, one or both of the drying gas deflector and the spray nozzle may comprise a component to secure the two together, for example, a spring loaded detent ball or pin. In some embodiments, the portion of the outer surface of the spray nozzle on which the drying gas deflector is mounted is a portion of the outer surface of the spray nozzle tip.

According to some embodiments, the deflector and the nozzle are formed as separate structures, which are connected one to the other by any method known in the art in such a way as to not interfere with droplet formation. Suitable methods include use of an adhesive or by using connecting components (e.g. providing clips, tabs, slots, threads, pins, knobs and the like on the distal edge of the hollow cylindrical portion and/or the proximal edge of the truncated cone portion) and/or by welding in such a way as to not interfere with droplet formation. The drying gas deflector may be connected to the spray nozzle and/or spray nozzle tip by forming the drying gas deflector from an elastomeric-material, such as silicone, wherein the drying gas deflector has an inner cross section 58 (e.g. diameter) which is smaller than the outer cross section (e.g. diameter) of the spray nozzle and/or spray nozzle tip, such that fitting is achieved by pressure caused by the elastic properties of the drying gas deflector.

According to some embodiments, the deflector and the nozzle are formed as a monolithic structure.

As used herein, the term "elastomeric-material" refers to a material having shape memory, and includes soft or semi rigid materials, such as rubbers, semi-rigid or hard plastics. Non limiting examples of elastomeric-material include silicone, viton, nitrile butadiene rubber (NBR), ethylene propylene diene monomer (EPDM), natural rubber, and thermoplastic polyurethane (TPU).

According to some embodiments, the drying gas deflector is formed from a material selected from the group consisting of silicone and polytetrafluoroethylene (Teflon®).

According to some embodiments, the material from which the drying gas deflector is formed has an elasticity in the range of from about 30 Shore A to about 70 Shore A, such as from about 30 Shore A to about 50 Shore A.

Shore A can be measured by use of a durometer which measures the hardness of elastomeric substances.

In some such embodiment, the inner cross section of the deflector 58 is about 1% to about 30% (depending on the elastomeric properties of the deflector) smaller than the outer cross section of the spray nozzle and/or spray nozzle tip.

In some such embodiment, there is substantially no physical gap between the deflector and the spray nozzle and/or spray nozzle tip.

In some such embodiments, the spray nozzle and/or spray nozzle tip and/or atomizing component 25 are formed from a rigid/stiff material, such as stainless steel and the like, that will not deform once the deflector is mounted thereon.

In some such embodiments, the shape of the part of the deflector that is mounted on the spray nozzle and/or spray nozzle tip and the shape of the spray nozzle and/or spray nozzle tip where the deflector is mounted/placed on are mateable.

According to some embodiments, the inner section 58 of the proximal end 59 of the drying gas deflector and an outer portion of the spray nozzle are respectively provided with mateable components, such as matchings threads or matching pin-and-groove components, such that mounting of the drying gas deflector on the spray nozzle and/or spray nozzle tip comprises rotating the drying gas deflector onto the spray nozzle and/or spray nozzle tip.

According to some embodiments, the drying gas deflector is fixed indirectly on the spray nozzle, for example by connecting the deflector to the drying chamber inner walls, drying chamber proximal end or any other part of the spray dryer unit which will allow the deflector to function as described.

According to some embodiments, the drying gas deflector is mounted on a part of the spray drying apparatus other than the spray nozzle or the spray nozzle tip. For example, according to some embodiments, the drying gas deflector is not mounted on the spray nozzle, but is placed at a location between the spray nozzle tip and the flow of drying gas, without the spray nozzle tip protruding beyond a distal end of the drying gas deflector. In such embodiments, the drying gas deflector may comprise, for example, an open flat or curved surface.

According to some embodiments, the drying gas deflector is formed from a thermally insulating material e.g. having a thermal conductivity of not more than 2 W/(m·K) at 300 K, such as not more than 0.5 W/(m·K), not more than 1 W/(m·K), not more than 1.5 W/(m·K), at 300 K.

According to some embodiments, the drying gas deflector comprises an open base at the distal end thereof 44, the open base being substantially circular, having a circumference in the range of from about 0.1 to about 10 mm, from about 1 to about 50 mm, from about 5 to about 15 mm and preferably from about 6 to about 10 mm, such as 6 mm, 7 mm, 8 mm, 9 mm or 10 mm.

According to some embodiments, the length 50 of the side section 46 of the drying gas deflector 40 are in the range of from about 0.1 to about 10 mm, from about 0.5 to about 7 mm, from about 1 to about 5 mm, preferably from about 2 to about 4 mm, such as about 2 mm, about 3 mm, about 4 mm, and more preferably about 2.9 mm.

According to some embodiments, the ratio of the circumference of the open base of distal end 44 to the length 50 of side section 46 is in the range of from about 1:100 to about 100:1, such as from about 1:7 to about 100:1, from 1:1 to 15:1 or from about 1.5:1 to about 5:1. In some embodiments, the ratio is about 3.45:1.

According to some such embodiments, the side sections of the drying gas deflector are at an opening angle 66 in the range of from about 0 to about 180°, about 1 to about 180°, from about 20 to about 170°, from about 40 to about 160°, from about 60 to about 150°, from about 80 to about 140°, from about 100 to about 130°, from about 110 to about 120°, preferably from about 115 to about 120°, such as 115°, 116°, 117°, 118°, 119° or 120°, and more preferably about 118°.

According to some embodiments, a length 63 of the drying gas deflector 40, i.e. the distance from the first (distal) end to the second (proximal) end of the drying gas deflector is in the range of from about 1 to about 10 mm, from about 2 to about 8 mm, preferably from about 3 to about 7 mm, such as about 3 mm, about 4 mm, about 5 mm, about 6 mm or about 7 mm, and more preferably about 6.5 mm According to some embodiments, the hollow cylinder of the drying gas deflector has a length 62 in the range of from about 1 to about 10 mm, from about 1.5 to about 5 mm, preferably from about 2 to about 3 mm, such as about 2.1 mm. about 2.2 mm, about 2.3 mm, about 2.4 mm, about 2.5 mm, about 2.6 mm, about 2.7 mm, about 2.8 mm, about 2.9 mm or about 3 mm, more preferably about 2.5 mm.

According to some embodiments, the ratio of the length 63 of deflector 40 to the length 62 of cylindrical portion 56 is in the range of from about 1:10 to about 10:1, such as from about 1:2.5 to about 5.33:1, from about 1:1 to about 2.33:1. In some embodiments, the ratio is about 2.6:1. According to some embodiments, the inner and/or outer dimensions of the drying gas deflector are such so as not to interfere with propagation of the spray.

According to some embodiments of the method, the liquid comprises a heat-sensitive substance, such as a protein, for example, fibrinogen.

According to some embodiments, the liquid is selected from the group consisting of a solution, suspension and emulsion comprising the heat-sensitive substance.

According to some embodiments, a temperature of the drying gas is in the range of from about 50° C. to about 200° C. According to some embodiments, a temperature of the drying gas is in the range of from about 100° C. to about 200° C., from about 120° C. to about 180° C., from about 140° C. to about 170° C. According to some embodiments, a temperature of the drying gas is at least 100° C. e.g. 140° C.

According to some embodiments, a temperature of the drying gas is about 140° C.

As used herein, the term "drying gas deflector" refers to a device which deflects the direction of flow of a drying gas in a spray-drying apparatus away from the spray nozzle tip.

In some embodiments, the direction of flow of the drying gas is deflected by up to about 90°, up to about 80°, up to about 70°, up to about 60°, or up to about 50° with respect to its original direction. In some embodiments, the direction of flow of the drying gas is deflected by up about 59°.

In one embodiment deflecting the flow of drying gas away from the spray nozzle tip results in minimizing and/or preventing the drying gas exiting the drying gas outlet from heating a space within up to about 5 mm from the nozzle tip, such as, for example, up to about 1 mm, up to about 2 mm, up to about 3 mm, up to about 4 mm or up to about 5 mm of the nozzle tip.

As used herein, the term "heat-sensitive substance" refers to a material (e.g. a protein) having a chemical or biological potency that may undergo a structural change and/or reduction of the potency when subjected to heat. A structural change includes, but is not limited to, denaturation, aggregation and/or polymerization.

As used herein, the terms "comprising", "including", "having" and grammatical variants thereof are to be taken as specifying the stated features, integers, steps or components but do not preclude the addition of one or more additional features, integers, steps, components or groups thereof. These terms encompass the terms "consisting of" and "consisting essentially of".

As used herein, the indefinite articles "a" and "an" mean "at least one" or "one or more" unless the context clearly dictates otherwise.

As used herein the term "about" refers to ±10%.

Unless otherwise defined, all technical and scientific terms used herein have the same meaning as commonly understood by one of ordinary skill in the art to which the invention pertains. In addition, the descriptions, materials, methods, and examples are illustrative only and not intended to be limiting. Methods and materials similar or equivalent to those described herein can be used in the practices of the present invention.

BRIEF DESCRIPTION OF THE DRAWINGS

Some embodiments of the invention are described herein with reference to the accompanying figures. The description, together with the figures, makes apparent to a person having ordinary skill in the art how some embodiments of the invention may be practiced. The figures are for the purpose of illustrative discussion and no attempt is made to show structural details of an embodiment in more detail than is necessary for a fundamental understanding of the invention. For the sake of clarity, some objects depicted in the figures are not to scale.

In the Figures:

FIGS. 4A to 4D are schematic representations of a perspective view, proximal end view, a side view and a distal end view, respectively, of the drying gas deflector of FIG. 3;

DESCRIPTION OF SOME EMBODIMENTS OF THE INVENTION

The invention, in some embodiments thereof, relates to a spray-drying apparatus comprising a drying gas deflector and a method of use thereof The principles, uses and implementations of the teachings herein may be better understood with reference to the accompanying description. Upon perusal of the description, one skilled in the art is able to implement the invention without undue effort or experimentation.

Before explaining at least one embodiment in detail, it is to be understood that the invention is not necessarily limited in its application to the details of construction and the arrangement of the components and/or methods set forth in the following description. The invention is capable of other embodiments or of being practiced or carried out in various ways.

The phraseology and terminology employed herein are for descriptive purpose and should not be regarded as limiting.

Figure 3:
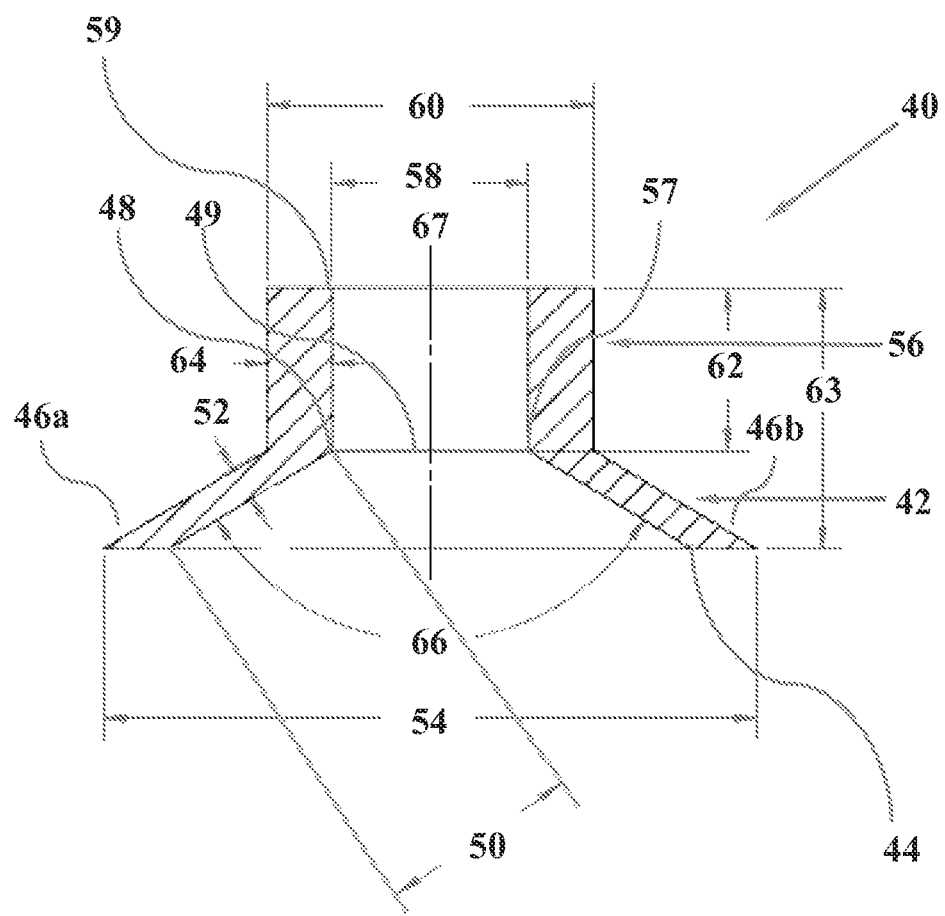
FIG. 3 is a schematic representation of an embodiment of a drying gas deflector in accordance with the principles of the present invention, shown in cross-section.

FIG. 3 is a schematic representation of an exemplary embodiment of a drying gas deflector 40 in accordance with the principles of the present invention, comprising a hollow, truncated-conical portion 42 having a distal end constituting distal end of drying gas deflector 44 comprising an open base with a circle-shaped periphery, and side section 46, inwardly tapering to a proximal end 48, proximal end 48 having smaller dimensions than distal end 44, proximal end 48 comprising an aperture 49 having a circumference configured for positioning at least partially around an outer circumference of a portion of spray nozzle 14 proximal to distal end 20 on which drying gas deflector is to be mounted. Side section 46 of drying gas deflector 40 has a length 50 and a thickness 52. Distal end 44 of drying gas deflector 40, comprising the open base of truncated cone portion 42 has an outer diameter 54.

Drying gas deflector 40 further comprises a hollow cylindrical portion 56, comprising a distal end 57 and a proximal end 59, distal end 57 extending from the proximal end 48 of truncated conical portion 42, in a direction opposite to that of distal end of drying gas deflector 40. Hollow cylindrical portion 56 has an inner diameter 58 having a circular aperture 49 with an inner diameter so as to be positioned concentrically around a portion of spray nozzle 14 on which drying gas deflector is to be mounted, an outer diameter 60, a length 62 and a wall thickness 64.

In the exemplary embodiment shown in FIG. 3, outer diameter 54 of distal end 44 of drying gas deflector 40, comprising the open base of truncated cone portion 42 of drying gas deflector 40 is 10 mm, side section 46 has length 50 of 2.9 mm and thickness 52 of 1 mm and side section 46 is configured to provide an opening angle 66 of about 118° between opposing sections 46*a* and 46*b* (shown in FIG. 3 in a side section view), that is to say, 59° from a longitudinal axis 67 of a spray nozzle on which the gas deflector is mounted. Hollow, cylindrical portion 56 has an inner diameter 58 of about 3 mm and an outer diameter 60 of about 5 mm, a length 62 of about 2.5 mm, and a wall thickness 64 of about 1 mm.

FIGS. 4A to 4D are schematic representations of a perspective view towards distal end 44 (FIG. 4A), a view facing the proximal end 59 (FIG. 4B), a side view (FIG. 4C) and a view towards distal end 44 (FIG. 4D), respectively, of the exemplary drying gas deflector 40 of FIG. 3.

Figure 5:
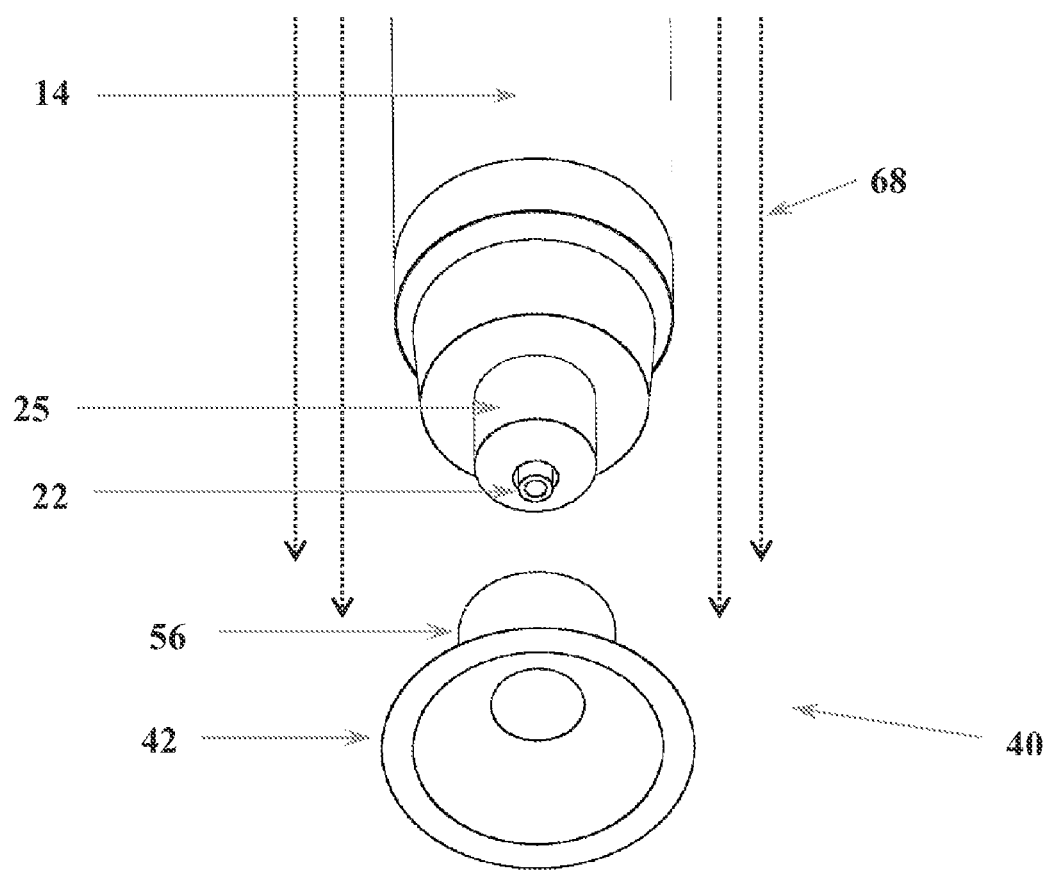
FIG. 5 is a schematic representation of the drying gas deflector of FIG. 3, and a spray nozzle on which the drying gas deflector is to be mounted.

FIG. 5 is a schematic representation of the exemplary drying gas deflector 40 described above and a spray nozzle 14 on which drying gas deflector 40 is to be mounted by sliding over a distal portion surrounding spray-drying nozzle tip 22. As shown in FIG. 5, proximal end 59 of hollow cylindrical portion 56 of drying gas deflector 40 is configured to be positioned concentrically around atomizing component 25 located at the distal end of spray nozzle 14.

In the embodiment depicted in FIG. 5, proximal end 59 of hollow cylindrical portion 56 of drying gas deflector 40 is configured to fit securely directly around an outer portion of the distal end of spray nozzle 14 such that mounting of drying gas deflector 40 on spray nozzle 14 comprises pushing drying gas deflector onto the distal end of spray nozzle 14. Optionally, spray nozzle 14 and hollow cylindrical portion 56 of drying gas deflector 40 may be provided with mutually mateable components, such as matching threads, such that mounting of drying gas deflector 40 on spray nozzle 14 comprises rotating drying gas deflector 40 onto spray nozzle 14.

Figure 1:
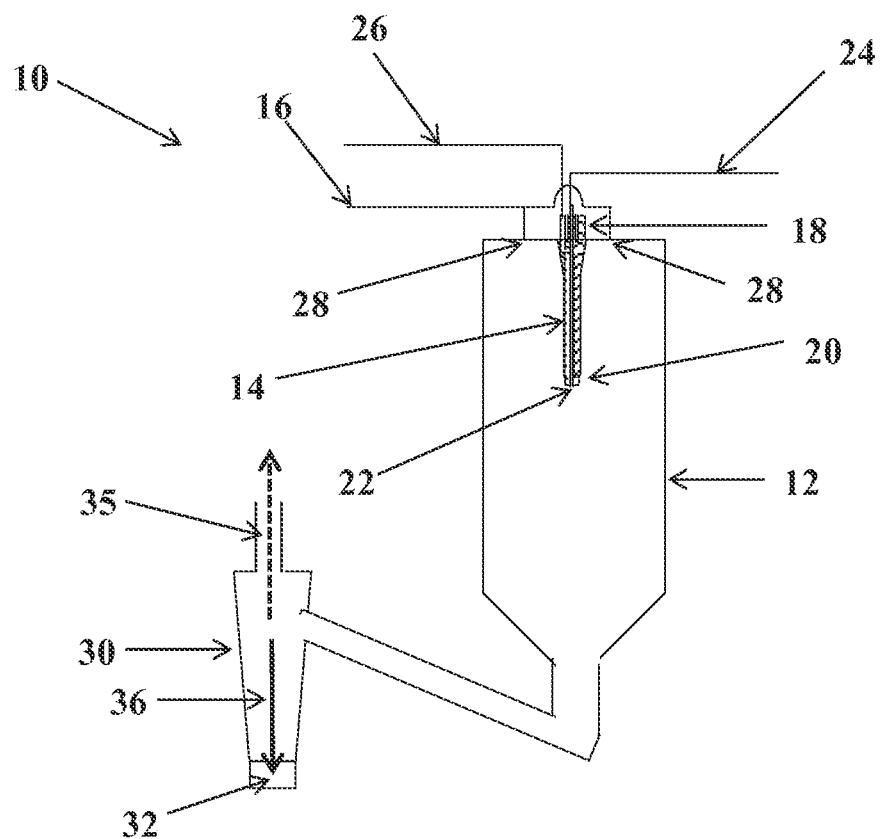
FIG. 1 (Prior Art) is a schematic representation of a prior art spray-drying apparatus.

As shown in FIG. 5, prior to mounting of drying gas deflector 40, on distal end of spray nozzle 14, drying gas from drying gas conduit 16 (see FIG. 1, not depicted in FIG. 5) flows substantially parallel to the longitudinal axis of spray nozzle 14 and past spray-drying nozzle tip 22, in a direction indicated by arrows 68, such that nozzle tip 22 is heated by the drying gas.

Figure 6:
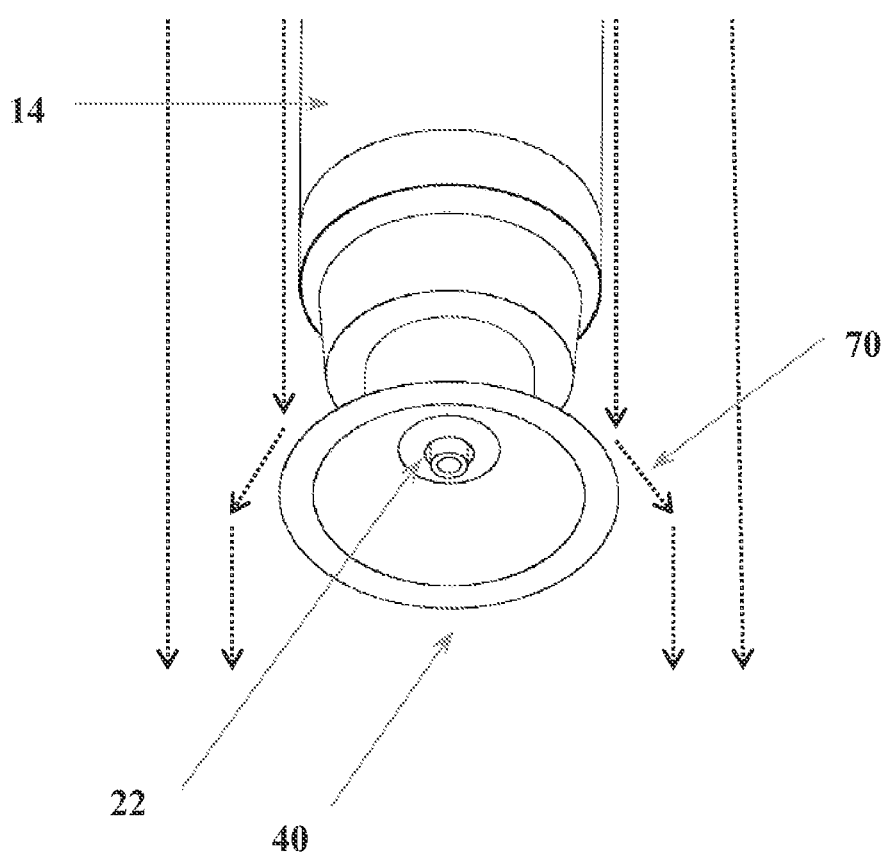
FIG. 6 is a schematic representation of the drying gas deflector of FIG. 3, mounted on a spray nozzle.

FIG. 6 is a schematic representation of drying gas deflector 40 mounted on distal end of spray nozzle 14. Spray-drying nozzle tip 22 is positioned within the hollow defined by truncated conical portion 42 of drying gas deflector 40, and does not protrude beyond distal end 44 thereof. Drying gas from drying gas conduit 16 initially flows substantially parallel to the longitudinal axis of spray nozzle 14. Upon encountering an external surface of side section 46 of truncated cone portion 42, the flow of the drying gas is deflected outwards, and away from nozzle tip 22, in a direction indicated by arrows 70. Drying gas deflector 40 acts as a thermal insulator, preventing substantial heating of nozzle tip 22 and/or of the inner volume defined by the side section 46 of truncated-conical portion 42 of the drying gas deflector by the hot drying gas.

In some embodiments, spray drying with a drying gas deflector 40 reduces the temperature by about 25% to 90%. In some embodiments the temperature at nozzle tip 22 is reduced by about 40% to 50%. In some embodiments the temperature within the inner volume is reduced by about 25% to 30%. In such embodiments, the reduction percentage is compared to the temperature of the hot drying gas measured in the same location without the use of a deflector during the spray drying process.

Figure 7:
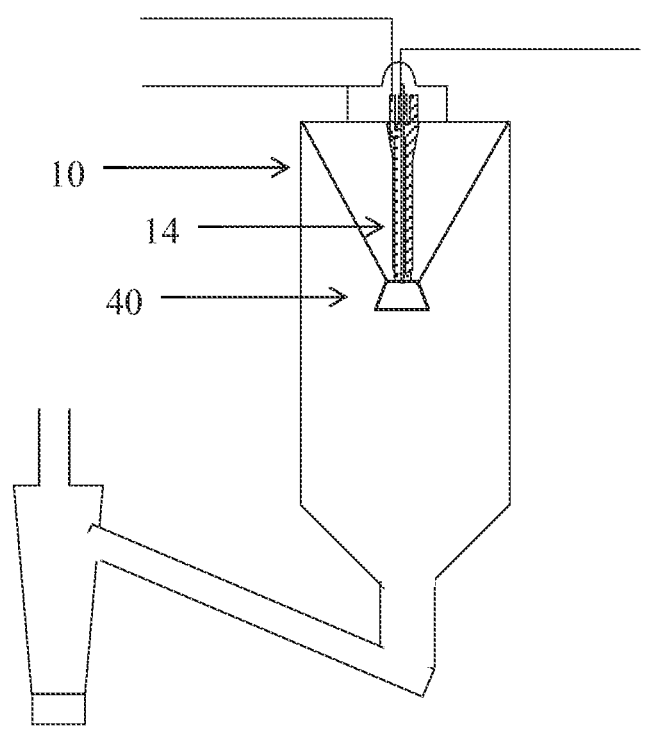
FIG. 7 is a schematic representation of a spray drying apparatus comprising a drying gas deflector fixed indirectly on the spray nozzle.

FIG. 7 is a schematic representation of spray drying apparatus 10 comprising drying gas deflector 40 fixed indirectly on the spray nozzle, for example by connecting the deflector to the drying chamber inner walls, drying chamber proximal end or any other part of the spray dryer unit which will allow the deflector to function as described.

EXAMPLES

Materials and Methods

Three different drying gas deflectors 40, each according to an embodiment of the teachings herein, were provided. Specifically, drying gas deflectors 40*a*, 40*b*, and 40*c* having a distal end 44 with an outer diameter 54 of 6 mm, 8 mm and 10 mm, respectively, were provided. Length 50 was also changed in order to allow for diameter 54 to be either 6 mm, 8 mm or 10 mm. All other dimensions were as described above with regard to FIG. 3.

Figure 2:
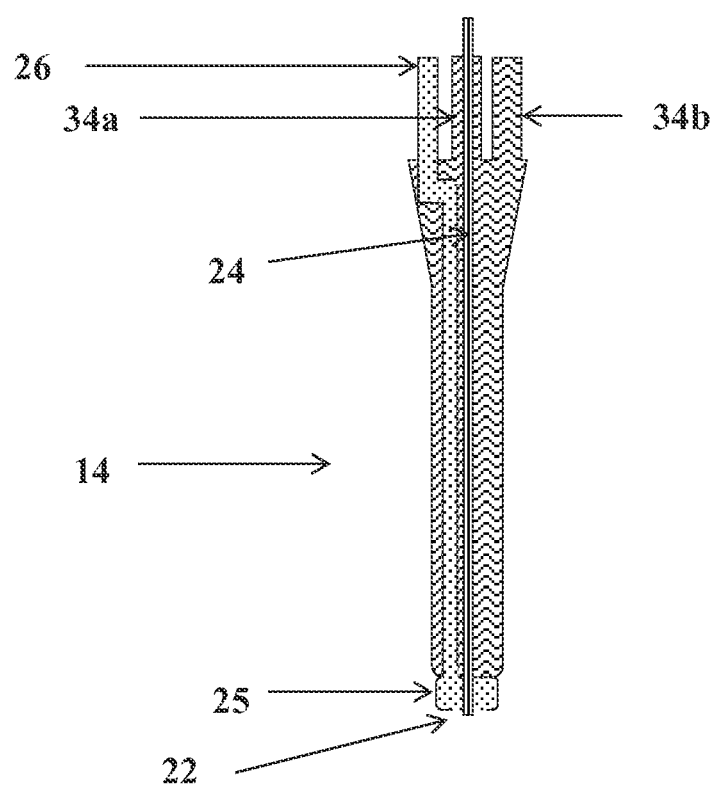
FIG. 2 (Prior Art) is a schematic representation of a portion of the spray-drying apparatus of FIG. 1, showing a prior art spray-drying nozzle.

Spray Drying apparatus 10 (4M8 trix, Procept Belgium) including a circulating cool water mechanism (as shown in FIG. 2) for spray nozzle 14 was used according to the manufacturer's instructions, with the following settings during a spray drying process:

inlet gas flow: 0.3 m$^3$/min;
inlet air temperature: 140° C.;
entering circulating cool water a temperature: 5° C.; and
nozzle atomizing air flow: 11 l/m.
Spray nozzle tip included a 1.2 mm diameter orifice.

Example 1: The Effect of a Drying Gas Deflector Mounted on a Spray Nozzle on Temperature During Spray-Drying For each experiment, one of the three drying gas deflectors 40*a*, 40*b*, 40*c* was mounted on spray nozzle 14 substantially as depicted in FIG. 6, drying gas was passed into drying gas conduit 16 at a temperature of 140° C., with no liquid passing through liquid conduit 24, and the temperature at different locations A, B, C and D relative to spray nozzle tip 22 was measured for each of gas deflectors 40*a*, 40*b* and 40*c*. As a control, the temperature at each of positions A, B, C and D was measured in the absence of a drying gas deflector.

Positions A, B and C represent positions along the longitudinal axis of the spray nozzle: at nozzle tip 22 (A), at 1 mm below nozzle tip 22 (B), and 5 cm below nozzle tip 22 (C). Position D represents a position 5 cm below nozzle tip 22 that is about 5 cm off-axis and which is close to the edge of a spray of liquid produced during operation of spray drying apparatus 10. Positions A and B are within the inner volume defined by the side section 46 of truncated-conical portion 42 of drying gas deflector 40*a*, 40*b* or 40*c*, while positions C and D are outside the volume. Position D is outside the longitudinal axis of spray nozzle 14. Positions C and D represent points at which drying of the spray formed from the liquid upon exiting nozzle tip 22 occurs.

Temperature measurements were performed using a thermocouple unit including a data logger TM-747D (MRC, Israel) and an air thermocouple wire (type T, MRC, Israel) as follows:

A guide wire (used to position the thermocouple wire in place) was inserted through the liquid conduit 24, such that the sensor was positioned at locations A, B, C or D. The thermal sensor was covered with a silicone tube, except for the distal end of the sensor which remained exposed and was configured to measure temperature.

Table 1 show the temperature in ° C. at the different locations, measured with or without a drying gas deflector 40 mounted on spray nozzle 14. The reduction in temperature with use of a deflector with respect to the temperature in the absence of a deflector is given in parentheses.

TABLE 1

| Thermal sensor location | Without drying gas deflector | With drying gas deflector | | |
| --- | --- | --- | --- | --- |
| | | Deflector diameter 10 mm - 40c | Deflector diameter 8 mm - 40b | Deflector diameter 6 mm - 40a |
| A | 62 | 35 (44%) | 31 (50%) | 35 (44%) |
| B | 56 | 40 (29%) | 42 (25%) | 40 (29%) |
| C | 110 | 50 (55%) | 45 (59%) | 50 (55%) |
| D | 110 | 103 (6%) | 100 (9%) | 104 (5%) |

The results show that when a drying gas deflector 40a, 40b or 40c according to the teachings herein was mounted on the atomizing component 25 of the spray nozzle 14, the temperature at spray nozzle tip 22 (position A) was reduced from 62° C. to between 31° C. and 35° C. (44-50% reduction in temperature), at which temperatures substantial protein denaturation does not occur during the short heating time used in the spray-drying process. At a distance of 1 mm from spray nozzle tip 22 (position B), a lesser temperature reduction of from 56° C. to between 40° C. and 42° C. was seen (25-29% reduction). At a distance of 5 cm from spray nozzle tip 22 (position C), a temperature reduction of from 110° C. to between 45° C. and 50° C. was seen (55-59% reduction), while at position D, at which presumably no deflection of drying gas occurs, no substantial reduction in temperature was seen (5-9% reduction) in the presence of a drying gas deflector 40a, 40b or 40c, such that drying of the spray will not be affected by an undesirable reduction in temperature at this location.

Example 2: The Effect of a Drying Gas Deflector Mounted on a Spray Nozzle During Spray-Drying on the Spraying Pattern of a Proteinaceous Solution 40 ml fibrinogen-containing solution, BAC2 (EVICEL® Fibrin Sealant diluted with an equal volume of double distilled water (DDW)), having a fibrinogen concentration of 30 mg/ml and a total protein concentration of 50 mg/ml, was spray dried as described above, with a drying gas deflector 40c mounted on spray nozzle 14.

The fibrinogen-containing solution was fed into the liquid conduit 24 at a rate of 400 ml/hour, and the effect on the spray pattern (the shape of the spray) was visually inspected.

As a control, the spray pattern was observed in the absence of a drying gas deflector 40.

After spray-drying of 30 ml of the fibrinogen-containing solution under the conditions described, in the absence of drying gas deflector 40c, aggregation of particles was observed at the edge of nozzle tip 22. As a result, after a time, the spray pattern was observed to deviate from a symmetrical conical shape, and droplets were accumulated on the inner surface of drying column 12. Also, it was observed that the size of the droplets produced increased over time, such that large droplets were produced instead of the fine droplets observed at the beginning of the spray-drying process.

At the conclusion of the spray-drying, spray nozzle tip 22 was inspected at the orifice of spray nozzle tip 22. It was observed that the orifice of spray nozzle tip 22 was filled with solid material.

Subsequently, drying gas deflector 40c, having a distal end 44 with an outer diameter 54 of 10 mm was mounted on spray nozzle 14, and the fibrinogen-containing solution was spray dried as described above. With drying gas deflector 40c mounted on spray nozzle 14, 40 ml fibrinogen-containing solution was spray-dried as described above. A uniform conical spray pattern was observed, with no deviation of the spray stream from the original direction, and the size of the droplets remained unchanged and fine during the entire process, with no observed accumulation of liquid or solids on the walls of drying column 12. At the conclusion of the spray-drying, spray nozzle tip 22 was inspected and it was observed that the orifice of spray nozzle tip 22 was clean and clear of any solid material.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

Citation or identification of any reference in this application shall not be construed as an admission that such reference is available as prior art to the invention.

The invention claimed is:

1. A spray drying apparatus comprising:
   (i) a spray nozzle having a proximal end and a distal end, said spray nozzle comprising:
   a spray nozzle tip at said distal end of said spray nozzle, said tip having a liquid exit aperture;
   a liquid conduit for guiding a liquid to be spray-dried out through said spray nozzle;
   an atomizing component for producing a spray of droplets from said liquid exiting said spray nozzle;
   (ii) a drying gas conduit comprising an outlet for directing a drying gas to dry said spray of droplets wherein the drying gas from the drying gas conduit flows substantially parallel to the longitudinal axis of spray nozzle and past spray-drying nozzle tip;
   and:
   (iii) a drying gas deflector having an inner volume and positioned so as to deflect a flow of the drying gas away from the spray nozzle tip, wherein the spray nozzle tip does not protrude beyond the distal end of the drying gas deflector, and wherein the liquid exit aperture is within the inner volume of the deflector.

2. A method of spray drying a liquid comprising:
   providing a spray drying apparatus according to claim 1;
   spraying a liquid as a spray of droplets from a spray nozzle tip;
   directing a flow of drying gas at said spray of droplets; and
   deflecting a flow of the drying gas away from the spray nozzle tip using said drying gas deflector.

3. The spray drying apparatus according to claim 1, wherein said atomizing component comprises an atomizing gas conduit for guiding a flow of atomizing gas out through an atomizing gas outlet to contact liquid exiting said spray nozzle tip.

4. The spray drying apparatus according to claim 1, wherein deflecting the flow of drying gas away from the spray nozzle tip prevents the drying gas exiting the drying gas outlet from heating a space within up to 3 mm of the spray nozzle tip in any direction.

5. The spray drying apparatus according to claim 1, wherein the drying gas deflector comprises an open base at a distal end.

6. The spray drying apparatus according to claim 1, wherein the drying gas deflector is mounted on the spray nozzle at a position proximal to the distal end of the spray nozzle.

7. The spray drying apparatus according to claim 1, wherein the drying gas deflector comprises a hollow, truncated cone portion having an open base in the shape of a circle; and a side section tapering to a proximal end, wherein the proximal end comprises an aperture having a circumference configured for positioning around an outer circumference, at least partially, of a position proximal to the distal end of the spray nozzle.

8. The spray drying apparatus according to claim 7, wherein the drying gas deflector further comprises a hollow cylindrical portion comprising a distal end and a proximal end, said distal end extending from the proximal end of the truncated cone portion in a direction opposite to that of the base of the truncated cone portion.

9. The spray drying apparatus according to claim 8, said hollow cylindrical portion having an inner diameter configured for positioning at least partially around an outer circumference of the spray nozzle.

10. The spray drying apparatus according to claim 8, wherein the truncated cone portion and the hollow cylindrical portion are formed as a monolithic structure.

11. The spray drying apparatus according to claim 1, wherein the drying gas deflector is mounted directly on the spray nozzle or the nozzle tip.

12. The spray drying apparatus according to claim 1, wherein the drying gas deflector is mounted directly on the atomizing component.

13. The spray drying apparatus according to claim 1, wherein the drying gas deflector is formed from a thermally insulating material.

14. The spray drying apparatus according to claim 1, wherein the inner dimensions of the drying gas deflector are such so as not to interfere with propagation of the spray.

15. The spray drying apparatus according to claim 1, wherein the liquid comprises a heat-sensitive substance.

16. The spray drying apparatus according to claim 1, wherein the heat-sensitive substance comprises fibrinogen.

17. The spray drying apparatus according to claim 1, wherein a temperature of the drying gas is at least 100° C.

18. The spray drying apparatus according to claim 7, wherein a ratio of the circumference of the open base of said distal end of said hollow, truncated cone portion to a length of the side section of said hollow, truncated cone portion is in the range of from about 1:100 to about 100:1.

19. The method according to claim 2, wherein the drying gas deflector comprises a hollow, truncated cone portion having an open base in the shape of a circle; and a side section tapering to a proximal end, wherein the proximal end comprises an aperture having a circumference configured for positioning around an outer circumference, at least partially, of a position proximal to the distal end of the spray nozzle.

20. The method according to claim 19, wherein the drying gas deflector further comprises a hollow cylindrical portion comprising a distal end and a proximal end, said distal end extending from the proximal end of the truncated cone portion in a direction opposite to that of the base of the truncated cone portion.

* * * * *